2,808,437

PROCESS OF MANUFACTURING β-AMINOVINYL CARBONYL COMPOUNDS

Heinrich Pasedach, Ludwigshafen (Rhine), Matthias Seefelder, Ludwigshafen, Rhine-Oppau, and Hermann Spaenig and August Weickmann, Ludwigshafen (Rhine), Germany, assignors to Badische Anilin- & Soda-Fabrik Aktiengesellschaft, Ludwigshafen (Rhine), Germany No Drawing. Application May 23, 1955, Serial No. 510,568

Claims priority, application Germany May 21, 1954

17 Claims. (Cl. 260—563)

This invention relates to an improved process of manufacturing β-aminovinyl carbonyl compounds. It relates especially to a process for the production of said β-aminovinyl carbonyl compounds by reacting an alkynol with an amino compound in the presence of an oxidizing agent.

β-Aminovinyl carbonyl compounds are well known intermediates for the manufacture of pharmaceuticals but there does not exist an industrial satisfactory method for their production. According to known methods, N-substituted β-amino acroleins which are β-aminovinyl carbonyl compounds may be obtained by the interaction of propargyl aldehyde with a primary or secondary amine. Such a process is however complicated and uneconomical because the propargyl aldehyde is an unstable compound obtained only in poor yields by the oxidation of propargyl alcohol. It is also known to manufacture β-aminovinyl carbonyl compounds by the reaction of an amino compound having at least one amino hydrogen atom with a 1,3-dialdehyde, or an acetal, or an enolether of such a dialdehyde (see U. S. Pat. No. 2,228,039). According to a publication of Kotschetkow (see Report of the Academy of Sciences of USSR (1955) 991 ff.) β-aminovinyl ketones may be produced by the reaction of amino compounds with β-chlorovinyl ketones.

These methods however are not of technical importance since 1,3-dialdehydes are difficult to obtain and the reactions of chlorovinyl ketones are hampered by their lachrymatory action.

The primary object of this invention is to provide a new and effective method of preparing β-aminovinyl carbonyl compounds.

A more particular object is to provide a method of manufacturing β-aminovinyl carbonyl compounds by the interaction of alkinols with an amino compound in the presence of an oxidizing agent.

Other objects of the invention will be apparent from the subsequent description, examples and claims.

In accordance with this invention, it has been found that β-aminovinyl carbonyl compounds of the formula:

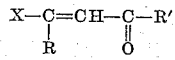

are obtained by a simple process and in a good yield by reacting an alkynol of the formula:

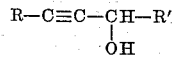

with a basic reacting amino compound having at least one amino hydrogen atom in the presence of an oxidizing agent. In these general formulas, X stands for an ammonia or a primary or secondary amino radical and R and R' for hydrogen, an alkyl or an aryl radical. Suitable alkynols are for example, propargyl alcohol, butine-(1)-ol-(3), pentine-(2)-ol-(4), heptine-(2)-ol-(1), 3-phenyl-propine-(1)-ol-(3). As amino compounds there may be used primary and secondary amines such as methyl amine, ethyl amine, propyl amine, tertiary butyl amine, dimethyl amine, diethyl amine, dipropyl amine; dicyclohexyl amine, pyrrolodine, piperidine, tetrahydroquinoline, morpholine and aromatic amines, for instance, analine, methyl aniline ethyl aniline and the corresponding toluidines. Ammonia is also a suitable amino compound for this reaction.

As oxidizing agent there may be employed various compounds such as auric oxide, and the higher oxides of other metals which occur in different valency states such as mercuric oxide, the higher oxides of vanadium, chromium trioxide, ferric oxide, nickel sesquioxide, cobalt sesquioxide, lead dioxide, minium, ceric oxide and manganese dioxide. Other suitable oxidizing agents are for instance manganese dioxide hydrate, manganic salts such as manganic triacetate, lead tetracetate, permanganates such as zinc, magnesium, silver, barium and potassium permanganate. These permanganates may be used together with the addition of alkali binding substances such as carbon dioxide, magnesium nitrate, and aluminium sulfate. Hydrogen peroxide and organic oxidizing agents such as quinones; nitro-benzene and nitro anisole may also be used as oxidizing agents.

The reaction can be effected by introducing the oxidizing agent in a mixture of the alkynol and the amino compound, which mixture may be diluted by a liquid such as benzene, toluene, mineral spirits, ethers, chlorinated hydrocarbons, alcohols or water. The oxidizing agent may be added gradually in small portions or all at one time with or without the addition of a diluent. It is however also possible to introduce the alkynol into a mixture of the oxidizing agent and the amine, as far as the amine is stable against the oxidizing agent. Advantageously the alkynol and the amine may be used in about equi-molecular amounts. However, an excess of the amine or of the alkynol is not detrimental. The oxidizing agent is used in an amount sufficient for equivalent oxidation. It is efficiently used in excess, especially when a solid type oxidizing agent is selected, for example in twice to twenty times the amount needed. The amount of the diluent has no upper limit. It will be good practice to use the diluent in an amount so that solid oxidizing agents, when these are used, are completely immersed in the liquid.

The most suitable reaction temperatures may be easily determined by preliminary trials. As a rule, suitable reaction temperatures lie between 10° C. and 150° C. Usually the reaction is carried out at normal pressure but increased or reduced pressure may also be used.

The β-aminovinyl carbonyl compounds may be separated from the reaction mixture as the case may be after the separation of the oxidizing agent in the usual manner, for instance, by distillation or crystallization.

In order that those skilled in the art may better understand how the present invention can be carried into effect the following examples are given by way of illustration and not by way of limitation. The parts are parts by weight.

*Example 1*

Into a mixture of 56 parts of propargyl alcohol (1 mol), 75 parts diethyl amine (1 mol) and 750 parts of benzene, there is introduced while stirring at a temperature between 20 and 30° C., active manganese dioxide hydrate portion-wise until no further temperature increase is observed. There is employed a total of about 500 parts of the oxidizing agent. The reaction mixture is then stirred for 12 hours at room temperature. Then the solid is filtered off from the liquid reaction mixture and the inorganic residue is twice extracted with boiling benzene. After adding the benzene extracts to the filtrate, the benzene is evaporated whereby 116 parts of a liquid residue are obtained. This residue distills under a reduced pressure of 12 torr (1 torr equals 1 mm. Hg) at a temperature between 160° C. and 161° C. yielding 111 parts of β-N,N-diethyl amino acrolein with the formula $(H_5C_2)_2N—CH=CH—CH=O$. The yield corresponds to 86 percent of the theoretical.

If 132 parts of di-n-butylamine are used instead of 75 parts of diethylamine 146 parts of β-N,N-di-butylamino acrolein are obtained under otherwise identical conditions.

Example 2

A reaction vessel equipped with a stirrer and a reflux condenser is charged with 1,000 parts of toluene, 100 parts of diethyl amine and 750 parts of ground manganese dioxide. While stirring, 56 parts of propargyl alcohol are introduced whereby the temperature of the reaction mixture increases by a few degrees. The mixture is now heated to boiling while refluxing it as long as filtered samples of the liquid reaction mixture indicate by titration with an acid, that the amount of the free amine ceases to decrease. Usually, a heating period from 12 to 15 hours is necessary. The solid is then separated by filtration and extracted with boiling toluene. The filtrate and the toluene extracts are combined and the toluene and about 4 to 5 parts of unreacted propargyl alcohol are distilled off under normal pressure. By a distillation under reduced pressure there are obtained 108 parts of β-N,N-diethyl amino acrolein, corresponding to a yield of 85 percent.

Example 3

100 parts of diethyl amine, 56 parts of propargyl alcohol, 600 parts of benzene and 500 parts of lead dioxide are refluxed for 18 hours and worked up as in Example 1. 58 parts of β-N,N-diethylamino acrolein are obtained.

Example 4

250 parts of activated manganese dioxide, obtained according to Attenburrow (J. Chem. Soc., London, 1952, page 1104) are suspended in 600 parts of benzene. After the addition of 73 parts of diethyl amine the mixture is heated to boiling temperature and within two hours 56 parts of propargyl alcohol are introduced. The water formed during the reaction is removed by a water separator which is interposed between the reaction vessel and the reflux condenser. The condensed benzene is returned from the reflux condenser to the reaction vessel. After introducing the total quantity of propargyl alcohol the refluxing of the mixture is continued for two hours and then the mixture is cooled. The solid is separated from the reaction mixture and exhaustively extracted with boiling benzene. The combined benzene solutions are distilled. There are obtained 64 parts of the β-N,N-diethyl amino acrolein.

Example 5

A mixture of 185 parts of nitrobenzene (1.5 mol), 129 parts of dibutyl amine (1 mol), 20 parts of cupric oxide (0.25 mol) and 212 parts of toluene (2.5) mols are heated in a vessel equipped with a reflux condenser. At a temperature of 135° C. of the reaction mixture, there are slowly introduced 56 parts of propargyl alcohol (1 mol). The condensed water in the reflux condenser is continuously removed. After about one and one-half hours, the splitting off of the water is finished and after cooling the liquid reaction product is separated by filtration from the solid. The solid is extracted with hot nitrobenzene and these extracts are added to the filtrate. The solutions are worked up by distillation and yield 52 parts of β-N,N-dibutyl amino acrolein which distills under a pressure of 11 torr at a temperature between 148 and 150° C.

Example 6

As in Example 4, there are reacted 70 parts of butine-(1)-ol-(3) with 73 parts of diethyl amine and 250 parts of activated manganese dioxide in 600 parts of benzene. There are obtained 73 parts of methyl-β-N,N-diethylaminovinyl ketone having the formula $(H_5C_2)_2$ N—CH=CH—CO—CH$_3$ with a boiling point between 130° and 132° C. at a pressure of 6 torr.

Example 7

750 parts of ground technical grade manganese dioxide are suspended in 1,000 parts of toluene. After the addition of 100 parts of diethyl amine and 70 parts of butine-(1)-ol-(3), the mixture is heated to boiling. The mixture is refluxed for 15 hours, then the solid is separated after cooling and extracted with 300 parts of boiling toluene. The combined toluene solutions yield on distillation under reduced pressure, 118 parts of the same product as in Example 5. This corresponds to 83 percent of the theoretical yield.

Example 8

250 parts of activated manganese dioxide (prepared by the Attenburrow method (Journ. Chem. Soc., London, 1952, page 1104)) are added to a solution of 73 parts of isobutylamine in 600 parts of benzene. The mixture is brought to boiling when 70 parts of butine-(1)-ol-(3) are added in the course of 2 hours. The mixture is kept boiling for another 8 hours and then filtered while hot. The inorganic residue is extracted with 300 parts of boiling benzene and then filtered. The filtrates are combined and subjected to fractional distillation, 42 parts of 1-isobutylaminobutene-(1)-on-(3) (B. P. 60–63° C. under 2.5 torr) being obtained. It gives a red-violet reaction with iron chloride.

Example 9

250 parts of activated manganese dioxide are added to a solution of 85 parts of piperidine in 600 parts of benzene, the mixture is heated to boiling and then 106 parts of 1-phenylpropine-(2)-ol-(1) are added in the course of 2 hours. The mixture is kept boiling for another 8 hours and then further processed as in Example 7. The filtrates are evaporated in vacuo until any unreacted phenyl-propinol has been distilled off. The residue is recrystallized from cyclohexane. There are obtained 120 parts of 1-phenyl-3-piperidinopropene-(2)-on-(1) having a melting point of 90° C.

Example 10

To a solution of 179 parts of dicyclohexylamine and 56 parts of propargyl alcohol in 600 parts of methanol there are added 250 parts of activated manganese dioxide, the mixture then being boiled for 30 hours under reflux. The inorganic residue is filtered off and extracted with 300 parts of boiling methanol. The filtrates are evaporated and the bottoms are heated to 130° C. under 1.5 torr. After recrystallization from cyclohexane 130 parts of β-(dicyclohexylamino)-acrolein are obtained. The compound has a melting point of 127° C.

Example 11

420 parts of 40 percent aqueous propargyl alcohol are run into a mixture of 2,500 parts of toluene, 750 parts of activated manganese dioxide, 750 parts of calcined sodium sulfate and 284 parts of diethylamine in the course of about 2 hours, the reaction mixture warming up to about 50° C. The mixture is stirred until its inner temperature has become equal to room temperature. From this mixture the water is separated azeotropically and the condensate is caused to form two layers of which the non-aqueous phase is re-fed into the reaction vessel, where it is allowed to settled and the supernatant layer is decanted. The inorganic residue is boiled repeatedly with fresh toluene. From the combined toluene solutions the solvent and any unreacted diethylamine are distilled off. By distilling the residue 297 grams of β-diethylamino acrolein (B. P. 129°–136° C. at 4–3 torr) are obtained. The yield amounts to 78 percent of the theory.

Example 12

To a solution of 321 parts of N-methylaniline and 56 parts of propargyl alcohol in 2,000 parts of toluene activated manganese dioxide (prepared by the Attenburrow method (Journ. Chem. Soc., London, 1952, page 1104)) is added while stirring and cooling with water until no evolution of heat is any more observed. The amount of manganese dioxide needed is about 500 parts. The mixture is then heated, the water is separated azeotropically and the condensate is caused to form two layers of which the non-aqueous phase is re-fed into the reaction vessel. The anhydrous reaction product is filtered off by suction and the filter cake is boiled several times with toluene. By distilling the combined extracts 39 parts of β-(methylanilino)acrolein are obtained. It melts at 49° and has a boiling point of 181°–187° C. at 5 torr.

Example 13

56 parts of propargyl alcohol are added to a suspension of 100 parts of magnesium sulfate containing crystal water (7H₂O) in 750 parts of benzene and into this mixture 63.2 parts of finely powdered potassium permanganate are fed in the course of 2 hours while stirring and cooling gently, 87 parts of diethylamine being simultaneously run in at a slow rate. When the heat evolved by these additions has subsided the bottoms are filtered off and thrice boiled with 100 parts of benzene. The combined benzene solutions are distilled, 4 parts of β-N,N-diethylaminoacrolein being obtained.

What we claim is:

1. An improved process of manufacturing β-N,N-diethylamino acrolein which comprises reacting at a temperature between 10° C. and 150° C. about equi-molecular amounts of propargyl alcohol with diethyl amine in the presence of excess manganese dioxide.

2. An improved process of manufacturing β-N,N-dibutylamino acrolein which comprises reacting at a temperature between 10° C. and 150° C. about equi-molecular amounts of propargyl alcohol with dibutyl amine in the presence of cupric oxide and nitrobenzene.

3. An improved process of manufacturing methyl-β-aminovinyl ketones which comprises reacting at a temperature between 10° C. and 150° C. about equi-molecular amounts of butine-(1)-ol-(3) with an amino compound selected from the group consisting of primary and secondary lower aliphatic amines, dicyclohexylamine, piperidine, anilines and toluidines having at least one hydrogen atom on the amino nitrogen in the presence of an oxidizing agent.

4. An improved process of manufacturing methyl-β-aminovinyl ketones which comprises reacting at a temperature between 10° C. and 150° C. about equi-molecular amounts of butine-(1)-ol-(3) with an amino compound selected from the group consisting of primary and secondary lower aliphatic amines, dicyclohexylamine, piperidine, anilines and toluidines having at least one hydrogen atom on the amino nitrogen in the presence of an oxidizing metal oxide.

5. An improved process of manufacturing methyl-β-(N,N-diethylamino)vinyl ketone which comprises reacting at a temperature between 10° and 150° C. about equimolecular amounts of butine-(1)-ol-(3) with diethyl amine in the presence of manganese dioxide.

6. An improved process of manufacturing β-aminovinyl carbonyl compounds which comprises reacting an alkynol selected from the group consisting of propargyl alcohol, butine-(1)-ol-(3) and 1-phenylpropine-(2)-ol-(1) with an amino compound selected from the group consisting of primary and secondary lower aliphatic amines, dicyclohexylamine, piperidine, anilines and toluidines having at least one replaceable amino hydrogen atom on the amino nitrogen in the presence of an oxidizing agent.

7. An improved process of manufacturing β-aminovinyl carbonyl compounds of the general formula

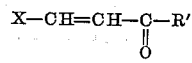

wherein R' stands for a member of the group consisting of hydrogen, methyl and phenyl radicals and X means an amino radical deriving from an amine selected from the group consisting of primary and secondary lower aliphatic amines, dicyclohexylamine, piperidine, anilines and toluidines having at least one replaceable amino hydrogen atom on the amino nitrogen, said process comprising reacting an alkynol selected from the group consisting of propargyl alcohol, butine-(1)-ol-(3) and 1-phenyl-propine-(2)-ol-(1) with an amino compound of the above mentioned group of amines in the presence of an oxidizing agent.

8. An improved process of manufacturing β-aminovinyl compounds of the general formula

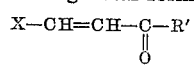

wherein R' stands for a member of the group consisting of hydrogen, methyl and phenyl radicals and X means an amino radical deriving from an amine selected from the group consisting of primary and secondary lower aliphatic amines, dicyclohexylamine, piperidine, anilines and toluidines having at least one replaceable amino hydrogen atom on the amino nitrogen said process comprising reacting at a temperature between 10° C. and 150° C. about equimolecular amounts of an alkynol selected from the group consisting of propargyl alcohol, butine-(1)-ol-(3) and 1-phenylpropine-(2)-ol-(1) with an amino compound of the above mentioned group of amines in the presence of an oxidizing agent.

9. An improved process of manufacturing β-aminovinyl compounds of the general formula

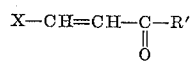

wherein R' stands for a member of the group consisting of hydrogen, methyl, and phenyl radicals and X means an amino radical deriving from an amine selected from the group consisting of primary and secondary lower aliphatic amines, dicyclohexylamine, piperidine, anilines and toluidines having at least one replaceable amino hydrogen atom on the amino nitrogen, said process comprising reacting at a temperature between 10° C. and 150° C. about equimolecular amounts of an alkynol selected from the group consisting of propargyl alcohol, butine-(1)-ol-(3) and 1-phenyl propine-(2)-ol-(1) with an amino compound of the above mentioned group of amines in the presence of an oxidizing agent in a liquid diluent.

10. The process as claimed in claim 6 wherein the oxidizing agent is manganese dioxide.

11. An improved process of manufacturing β-amino acroleins which comprises reacting at a temperature between 10° C. and 150° C. about equimolecular amounts of propargyl alcohol with an amino compound selected from the group consisting of primary and secondary lower aliphatic amines, dicyclohexylamine, piperidine, anilines and toluidines having at least one replaceable amino hydrogen atom on the amino nitrogen in the presence of an oxidizing agent.

12. An improved process of manufacturing β-amino acroleins which comprises reacting at a temperature between 10° C. and 150° C. about equimolecular amounts of propargyl alcohol with an amino compound selected from the group consisting of primary and secondary lower aliphatic amines, dicyclohexylamine, piperidine, anilines and toluidines having at least one replaceable amino hydrogen atom on the amino nitrogen in the presence of manganese dioxide.

13. The process as claimed in claim 12, wherein the amino compound is a lower aliphatic primary amine.

14. The process as claimed in claim 12, wherein the amino compound is a lower aliphatic secondary amine.

15. The process as claimed in claim 12, wherein the amino compound is di-n-butyl amine.

16. The process as claimed in claim 12, wherein the amino compound is N-methyl aniline.

17. The process as claimed in claim 12, wherein the amino compound is dicyclohexylamine.

No references cited.